United States Patent [19]
Du

[11] Patent Number: 5,475,767
[45] Date of Patent: Dec. 12, 1995

[54] METHOD OF INPUTTING CHINESE CHARACTERS USING THE HOLO-INFORMATION CODE FOR CHINESE CHARACTERS AND KEYBOARD THEREFOR

[76] Inventor: Bingchan Du, Flat No. 601, House No. 4, Lane No. 84, Hongqiao Lu, Shanghai 200030, China

[21] Appl. No.: 95,485

[22] Filed: Jul. 23, 1993

Related U.S. Application Data

[63] Continuation of Ser. No. 750,275, Aug. 27, 1991, abandoned, which is a continuation-in-part of Ser. No. 627,742, Dec. 14, 1990, abandoned.

[30] Foreign Application Priority Data

Dec. 30, 1989 [CN] China .................. 89/109707.4

[51] Int. Cl.⁶ .................................................. G06K 9/00
[52] U.S. Cl. ............................................. 382/185; 400/110
[58] Field of Search .................................. 382/11, 13, 24; 400/110; 364/514

[56] References Cited

U.S. PATENT DOCUMENTS

| | | | |
|---|---|---|---|
| 4,173,753 | 11/1979 | Chou | 382/24 |
| 4,559,615 | 12/1985 | Goo et al. | 400/110 |
| 4,718,102 | 1/1988 | Crane et al. | 382/24 |
| 4,920,492 | 4/1990 | Wang | 400/110 |
| 4,954,955 | 9/1990 | Chiu | 400/110 |

*Primary Examiner*—Yon J. Couso
*Attorney, Agent, or Firm*—Birch, Stewart, Kolasch & Birch

[57] ABSTRACT

The present invention relates to the coding of Chinese characters, and more specifically to the holo-information code of Chinese characters. The holo-information code is based on radicals and the order of strokes of Chinese characters, wherein the radicals are classified and grouped together according to the order of their first phonetic letter in the phonetic alphabet or according to their number of strokes. The Chinese characters are encoded according to the representative codes of the broken down radicals of Chinese characters. Without resorting to any formulas, only 100 radicals are used which first grade pupils can learn to read and which are the most common in forming characters. The radicals, which are broken down from Chinese characters according to the order of strokes in calligraphy (handwriting), are arranged according to the order of the first phonetic letter of Chinese characters' phonetic transcriptions in the phonetic alphabet or the number of strokes. Two Tables of 100 radicals-Holo-Information Code I and Holo-information Code II are formed to meet the different needs of users. This code features universality, low cost, fewer number of key striking, low repetition code rate, wide fields of potential applications, and has the advantage of being able to be operated on general-purpose machines.

9 Claims, 2 Drawing Sheets

[ ] : key name radicals
( ) : variant forms and complex forms of Chinese Characters

FIG. 1

[ ] : key name radicals
( ) : variant forms and complex forms of Chinese Characters

METHOD OF INPUTTING CHINESE CHARACTERS USING THE HOLO-INFORMATION CODE FOR CHINESE CHARACTERS AND KEYBOARD THEREFOR

This application is a continuation of application Ser. No. 07/750,275, filed on Aug. 27, 1991, now abandoned; which was a continuation-in-part application of Ser. No. 07/627,742, filed on Dec. 14, 1990 now abandoned.

FIELD OF THE PRESENT INVENTION

The present invention relates to the coding of Chinese characters, and particularly, it relates to a method of inputting Chinese characters using the holo-information code for Chinese characters and the keyboard arrangement therefor.

BACKGROUND OF THE PRESENT INVENTION

It is well known that the method for encoding and inputting Chinese characters is one of the keys to information automation technique for Chinese characters. However, a difficult problem demanding prompt solution in the world at present is how to turn the troublesome Chinese characters, which have a long history of over five thousand years and which are being commonly used by hundreds of millions of people, into the Latin alphabet or Arabic numeric codes which prevail in the world to carry out international information exchange by means of electronic, wired, or wireless radio techniques.

For this reason, many experts and scholars have been engaged in research and exploration work in this field. It is reported that the methods for encoding Chinese characters at present amount to over 400. Although several hundred schemes of inputting Chinese characters have been put forward, only a few are really put into actual use. Few of them, if any, can be easily used or mastered. The cause for this is, in the final analysis, the many man-made rules which are different from the rules of the stroke order for Chinese characters and the rules for character formation generally acknowledged and accustomed to by people. This results in more content to be committed to memory by people; in addition, operators find it inconvenient and difficult to grasp the rules because of the high code repetition rate, error rate, low operating speed and low efficiency.

For instance, the advantage of "Knowing Code Upon Seeing Chinese Characters" invented by Dr. Zhi Bing Yi is that it is easier for an operator to operate on machines as long as the operator can basically master the knowledge of phonetic transcription of Chinese characters and can break down Chinese characters into character components (basic structural parts of Chinese characters) according to the order of strokes and that it can be used on machines with a small keyboard at low repetition rate. Its disadvantage lies in that operators need to learn, by memory, many related words and need to master correctly the initial consonants and vowels of Chinese characters. To achieve this, operators must be specially trained for one or two months, furthermore, mistakes are frequently made.

The advantage of "3-Corner Encoding Method" assigned to Wang An Co. Ltd. (USA), is that if an operator can learn by memory "99 Table", the operator can type with one hand and the method can be used on machines with a small keyboard having only digital keys, and its code being less repetitious. Its drawbacks lie in that, it is difficult for operators to learn by memory "99 Table" and in fact, the Table must be placed by the side of the machine, thus, slowing the speed of striking keys. Secondly, the increase and decrease of radicals are not rational, for instance, radical "[1]" (see appendix table III for character represented by [1]) is separated from radical "[2]" with neither conforming to convention nor being necessary. Another example is radical "[3]". Adding radical "[3]" is unnecessary because its ability of forming words is very uncommon. Still another example, in this method, radical "[4]" is similar to the original form of radicals "[5]" and "[6]" which does not conform to the fact that Chinese characters are mostly pictographic or onomatopoeic. Furthermore, a Chinese character is by nature a character with four corners, thus, sacrificing one corner to reduce the number of key striking entails a set of man-made rules, which cause errors in operation.

As to "The Tian Long (Draconic) Cang Jie Word-Building Method" by Mr. Zhu Bang Fu, its advantage is a low code repetition rate and being able to be operated on a small keyboard. Its drawback is a man-made set of formulas, classifications, and auxiliary word shapes, which are over elaborate and difficult to be committed to memory. Thus, the rules are liable to be forgotten.

As to input codes "Five Strokes of Chinese Characters", "Five-Stroke Bridge", "Five Stroke Word Shape" invented by Wang Yong Ming, their advantages are that they can be operated on small keyboards with a low code repetition rate, and that it is unnecessary for operators to know the pronunciations of Chinese characters. The disadvantages are that operators must learn by memory 25 formulas, otherwise, keys can't be correctly striken. Moreover, because English letters and Chinese characters phonetic transcription are not handled in a unified way, it is impossible to make use of the sound of Chinese characters which is one of the three essential factors of Chinese characters (shape, sound, and meaning). Thus, the information which Wang's codes make use of is not holo-information.

The advantage of "Qian Code", developed by Dr. Qian Wei Chang, is that the structures of Chinese characters are reduced macroscopically and an analogy is drawn with the forms or shapes of English letters. For example, "[7],[8],[9],[10],[11], and [12]" are reduced and made analogous with English letter "L" . "[13],[14],[15],[16],[17],[18],[19], and [20]" are reduced and made analogous with English letter "I". But the forms and structures of Chinese characters are quite different from the curves, lines, arcs and corners of Latinized letters, thus users may be unaccustomed to drawing analogies, thereby making wrong choices.

As for "[21]" (QI) Encoding Method developed by Li Guai Sheng of Guangxi Institute for Nationalities, its advantages are simplicity and easy to learn. Its disadvantages are: (1) radicals and strokes are separately classified, therein radicals are too simple and classified into only 15 phonetic letters, the number of strokes are only one stroke more then 5 and are classified into numerals, and the classifications show lack of consistency; (2) left turning strokes and right turning strokes are often difficult to distinguish, for example, the left and right turnings of character "[ 22]" are undistinguishable, thus it is very easy to cause erroneous encodings; (3) all letter keys and 0–9 numeral keys are not made use of, dispersity is rather low, hence code repetition rate is high; (4) mingled use of Latin letters and numerals in encoding makes codes unequal in length, resulting in lack of harmony and neatness of codes, difficulty in dividing characters; and (5) it is only suitable to input individual character, unable to operate with rapid input of terms.

In addition, a GOO coding system has been found in U.S. Pat. No. 4,559,615. The Goo Coding Method includes two steps: 1) Locate the radical part of the Chinese character, i.e., one of the 97 predetermined elements, as included in Table III, if any; and 2) Mentally remove the radical part, if any, of the character and form the five-digit code on the remaining part of the character, or on the entire character if there is no predetermined element present, by the four Corner coding Method.

As seen from the above, the GOO Code is a combination of the numerical code of the radical plus four Corner Code. First, the GOO Code is an improved Four Corner Code. Only the GOO Code overcomes the drawbacks of Four Corner Code, i.e., many ambiguities exist in this coding scheme. Before the Chinese characters are encoded using the Four Corner Coding Method, the radical parts are located according to the predetermined element of Table III. If no such predetermined element is present, the eighth digit of code is determined by counting the total number of strokes in the balance of the character after the mental removal of the predetermined element, or in the entire character. It is apparent that the G00 code is not fully based on the radical and the strokes of Chinese characters.

U.S. Pat. No. 4,954,955 to Chiu discloses a method for encoding ideographic characters in which a set of predetermined basic stroke components, a selected frequently used radical, and selected frequently used ideographic character are arranged on 26 letter keys and 10 numerical keys. Its arrangement is irregular. Therefore, many man-made rules are requested to be memorized in the Chiu code.

In contrast, the present invention can be universally used when people have mastered the first phonetic letter of 100 common radicals and the rules for the stroke order of Chinese characters. So the present invention's unique creativeness lies in simplicity and ease of use.

U.S. Pat. No. 4,920,492 to Wang discloses a method of inputting Chinese characters based on the "stroke order" wherein 244 radicals are allocated to the 41 keys of a standard keyboard. This arrangement is made according to the frequency of usage of each of the radicals. In contrast, an arrangement is made by the present invention in accordance with the first phonetic letter of each of the radicals. Wang's method is based on the "stroke order" more particularly, a radical is selected covering as many strokes as possible. While the present invention is characterized in that the Chinese character is keyed in with four codes, i.e., a first code, the first phonetic letter of Chinese phonetic transcription of the radical being keyed in; a second code, the first phonetic letter of Chinese phonetic transcription of the continuing stroke of the radical being keyed in; and a last code, the first phonetic letter of Chinese phonetic transcription of the last stroke of the radical being keyed in.

U.S. Pat. No. 4,173,753 to Chou discloses an input system for Chinese characters wherein the Chinese characters are divided into six basic strokes and are designated as numerical symbols according to the basic stroke and the sequence of the stroke. The Chou invention is a code of six strokes. In the Chou method, the Chinese characters are broken up into six basic strokes in accordance with the exact stroke writing sequence of any characters, then each character is given a spelling number to represent the character.

OBJECT OF THE PRESENT INVENTION

In view of the above-mentioned facts, the object of the present invention is to provide a method of inputting Chinese characters using the holo-information code for Chinese characters based on common knowledge and usual practice, with no need for any formulas and burdensome memorization.

Another object of the present invention is to provide a keyboard for use with the same.

SUMMARY OF THE PRESENT INVENTION

These and other objects, which will become more understandable from the following description of specific embodiments, can be met, according to one advantageous concept of the invention, by an inventive method characterized in that Chinese characters are inputted by using the holo-information code for Chinese characters, comprising the following steps:

(1) Dividing a Chinese character into the radical(s) according to the conventional rules for the order of strokes which are based on Chinese calligraphy (handwriting) and habit, namely: first horizontal stroke, then right-falling stroke; first left then right; first upper part then lower part; first outer part then inner part; first outer part, then inner part, and then closing stroke; and first middle, then two side, in which the radicals with most stroke should be broken up in every step;

(2) Determining the code of the Chinese character according to the first phonetic letter of the phonetic transcription of the radical(s) and the name of the order of strokes of the radical(s), in which the letter V represents ü and the letter O having no corresponding radical is used as a function key, in the name of the order of strokes, H represents a horizontal stroke, Z represents a vertical stroke, D represents a dot stroke, P represents a left-falling stroke, N represents a right-falling stroke, T represents a rising stroke, W represents a bend stroke and G represents a hook stroke; or according to numeral code corresponding to the radical(s) and the name of the order of strokes of the radical(s); in which the radicals are arranged according to the order of the two-digit numbers (00–99).

(3) Inputting Chinese Character according to the code to be determined.

The radicals of the present invention can be either arranged on the keyboard according to the first letter of phonetic transcription thereof or arranged in the order of 2-digit numbers (00–99). The present invention selects 100 radicals which are most common in forming characters and which first grade pupils can learn to read. The 100 radicals are arranged in two ways into two tables.

In Table I, the 100 radicals are arranged with their first phonetic letter of Chinese phonetic transcription in the order of the Chinese phonetic (Latinized) alphabetic, while in Table II, the 100 radicals are arranged in the order of the 2-digit number (00–99) which are based on 8 kinds of starting strokes and the number of character strokes, wherein the letters A–Z in the Table I correspond to the keys A–Z on the standard keyboard and the radicals represented by numerals 00–99 can be entered by numeral keys 0–9 according to numerals corresponding to the radicals. The resulting Holo-Information Code I and Holo-Information Code II can meet the needs of different users and can be operated on general-purpose machines. For the convenience of keying, 100 radicals in Table I can directly be mounted on the keyboard, as shown from FIG. 1, wherein keys A–Z in the Table I, except that key 0 having no corresponding radical is used as a function key and key V is used as key Ü.

The present invention makes full use of the certainty and boundary clarity of the information derived from four major elements of Chinese characters such as phonetic transcription, radicals, the order of strokes, and strokes themselves, while discarding information with boundary ambiguity and uncertainty, such as word forms and corners.

Compared with the previous input codes, the present invention would be universally used by the operators all over the world if only they could master the first phonetic letter of 100 common radicals and the rules for the stroke order of Chinese characters, and the codes can be operated on any foreign language keyboards including English, Russian, German, French, Italian, Japanese, Latin, international phonetic symbols, etc. Its unique creativeness lies in simplicity and ease for use. It discards all man-made formulas and subjectively determined corners, upper and lower parts of characters which lead to burdensome memorization. The present codes also combine flexibly and harmonically letter codes with numeral codes, thus making it suitable to different users.

The present invention can be widely used in a general purpose computer with a small keyboard and various reference book and dictionaries in Chinese and has realized unified codes for use in computer, dictionaries, documents and telecommunication.

With the present invention, it only takes a day or one day to learn to encode and to operate machines with the advantages of no special training required, low cost of both software and hardware, being suitable to general purpose small keyboard, low key striking times (1.33 times/per character on the average) and a low code repetition rate (lower than one thousandth).

In addition, the present invention may be at least used in the following 10 aspects: 1) computerized typing of Chinese characters, editing and composing (typesetting); 2) telegram code and telex code can be unified in Latinized codes and can be translated automatically by machines into Chinese language; 3) implementing a national zip code; 4) an aid to computerized translation from Chinese into foreign languages; 5) an aid to translation between ancient Chinese language and writings in the vernacular; 6) stenography; 7) shortened writing; 8) book cataloguing and dictionary indexing; 9) rapid transcription and recording; 10) medical self-consulting, management consulting for various trades, including agriculture, forestry, animal husbandry, side-line occupation, fishery, industry, finance culture, army and administrative departments of government.

The present invention makes complex Chinese characters become holo-information codes which surpasses any foreign languages in input speed. It explores inherent merits of Chinese characters, turns them into scientific, standard, succinct, neat, and fine codes, thereby erecting a bridge for exchange between Eastern and Western cultures.

BRIEF DESCRIPTION OF THE DRAWINGS

The present invention will become more fully understandable from the detailed description given below and the accompanying drawings which are given by way of illustration only, and thus are not limitative of the present invention, and wherein:

FIG. 1 schematically depicts one embodiment of an inventive keyboard for performing the inventive method.

DETAILED DESCRIPTION OF THE DRAWINGS

Figure 2:
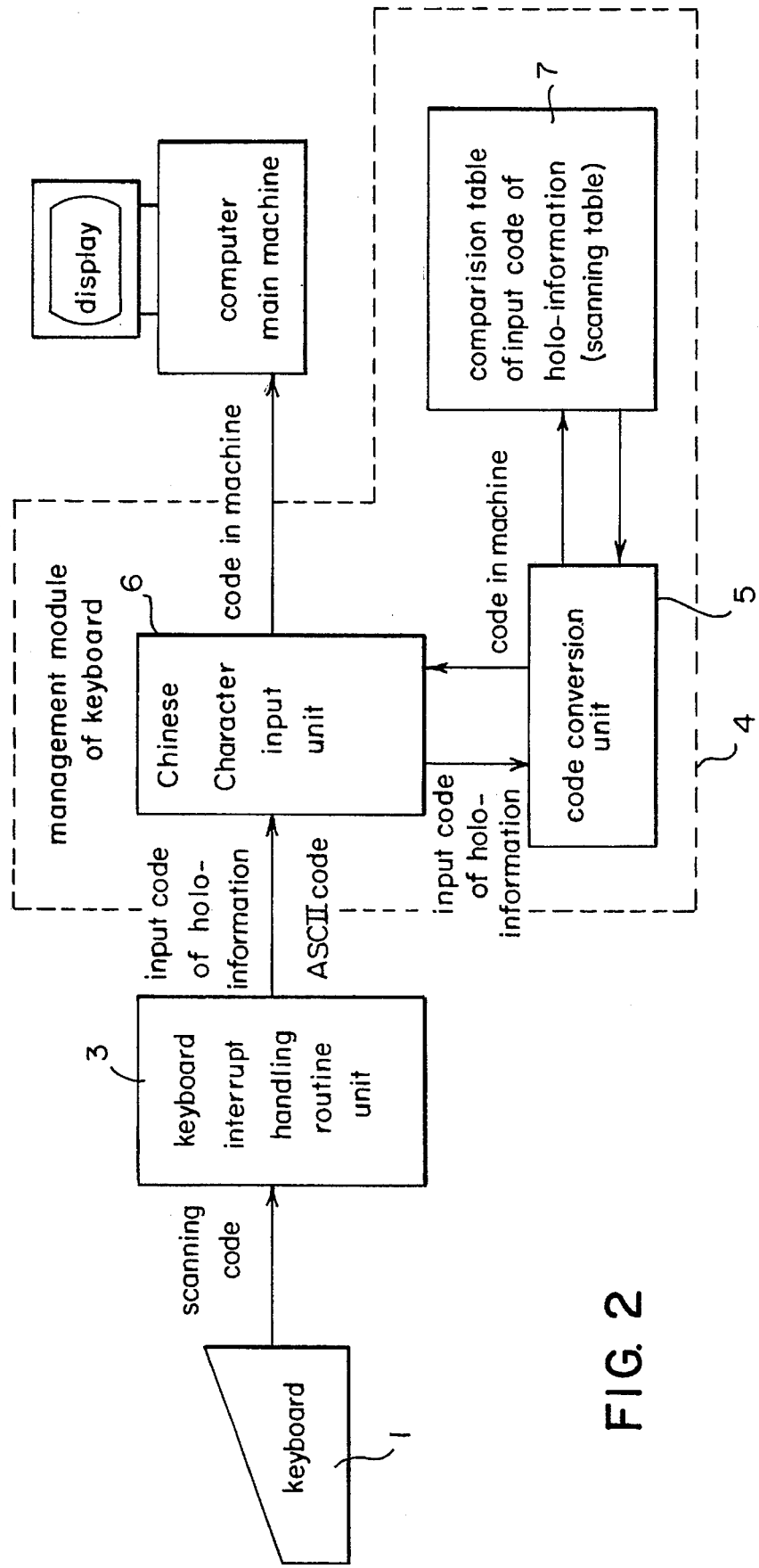
FIG. 2 depicts a process for inputting Chinese characters using the Holo-Information code for Chinese characters.

A description will be made in more detail below in conjunction with embodiments of the present invention.
Embodiment 1

Holo-Information Code I

1. Table of 100 radicals(I): (see appendix Table I)

The 100 radicals of Chinese characters are arranged in the order of their first phonetic letter of Chinese phonetic transcription in the phonetic alphabet. Among 26 letters, V is used as Ü, and the letter O having no corresponding radical is used as a function key. Most of the radicals themselves are characters in common use and their first letter of phonetic transcription is known to users. The basic strokes make out 8 strokes of Chinese character "[23]", which have been used since the Tang and Song dynasties. The eight strokes are: horizontal stroke, vertical stroke, left-falling stroke, right-falling stroke, rising stroke, hook stroke, dot stroke and bend stroke. All characters with hook are considered as hook stroke. These eight basic strokes are more conforming to the reality of Chinese characters as compared with five and six strokes; moreover, they increase greatly dispersity for avoiding code repetition.

2. Seven rules for the stroke order of Chinese characters:

Though the forms of over 50,000 Chinese characters vary from character to character, the rules for the order of strokes observed in calligraphy are only seven in number ("[21]" code and some others increase the rules for the order of strokes to more than 10, which is not reasonable). These rules have been observed by people and people have gotten used to them for some thousands of years. No matter whether viewed from habit or vision, the start stroke radical, the continuing stroke radical, the next-to-the-last stroke radical and the last stroke radical are most easy to distinguish. More than 80% of Chinese characters are pictophonetic characters with one element indicating meaning and the other, sound. Taking the above four radicals, means that consideration is given to both left, right, upper and lower side elements without concentrating on one element or the other, which given full play to the increase of dispersity and decrease of code repetition rate.

Dividing the Chinese characters into radicals (including strokes) according to the seven rules for the order of strokes (on the basis of Chinese calligraphy and habit, namely: first horizontal stroke, then vertical stroke; first left-falling stroke then right-falling stroke; first left then right; first upper part then lower part; first outer part then inner part; first outer part then inner part and then closing stroke; and first middle then two sides, when dividing a character into radicals, care must be taken that the broken down radicals must have the most strokes.

The rules for the order of strokes are illustrated with examples below (see the appendix Table IV):

The above examples are the rules for the order of strokes, showing how characters are broken down into strokes, the Tables (I) and (II) of 100 radicals of the present invention are the broken down radicals of Chinese characters. The principle to be observed for each step of decomposition is to break down radicals with the most strokes, for example, the Chinese Character "[24]" is broken down into "[25]" rather than into "[26]". If characters must be written upside down, e.g., "[27]" , these characters are still broken down as the normally written characters.

3. Examples for encoding Chinese characters (1) Single radical characters (radical itself being a character)

The greater part of radicals in the Table of 100 radicals are not only radicals in common use but also independent characters in use. There is a reluctance to break a radical into fragmented "character root" or "character element". If so doing, except to encode, these character roots and elements would be unknown. In the Table (I) of 100 radicals, the radicals are grouped according to sounds and these radicals are further classified into one stroke radicals and key name radicals (which are common in forming characters) and general radicals. The purpose of so doing is to reduce the code repetition rate when the following composite characters are encoded. With single radical characters, such classifications are unnecessary. When the single radical characters are encoded, the first letter of initial consonant or simple or compound vowel of a Chinese syllable of the phonetic transcription and the codes of the starting stroke, the continuing stroke and the last stroke of the single radical characters are taken, and the corresponding keys are stricken. Standard forms, variant forms, simplified forms, complex forms all are encoded in the same manner. When further breakdown is impossible, the "O" key is stricken instead.

Finally, Chinese characters are inputted according to the codes to be determined. FIG. 2 clearly illustrates the full process for inputting Chinese Characters using the Holo-Information code.

Because a phonetic letter can include some single radicals, the dispersity for using the above three strokes is equal to 8×8×8=512.

No repetition codes are possible. For example: (See the appendix Table V: A)

(2) Composite character consisting of two radicals

A composite character composed of two radicals is also encoded with four phonetic letters striking key four times. The present invention doesn't make use of the shapes for encoding.

Chinese Character shapes can be classified into left-right shape, upper and lower shape and hybrid shape. In fact, the shapes of Chinese characters are not limited to these three kinds. There are also so-called left-middle-right, upper-middle, lower, diagonal, cross, semi-enveloped, fully enveloped shapes and so on. And sometimes it is very difficult to distinguish them. The value of information utilization lies on the certainty of the information. For information with no clear boundary or difficult to distinguish, the use of it is not justified, because it is liable to cause errors. For this reason, the holo-information code method of the present invention discards the use of shape in distinguishing characters.

The encoding of the two-radical composite characters is as follows:

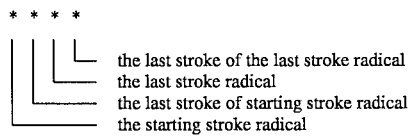

Thus, even in the case where the two radical codes are the same, there exists still a dispersity of 8×8=64. This is four times more then that of 3×5=15 (three character shapes * five strokes) in the method relying on shapes, resulting in far less code repetition with the present invention.

If the starting stroke or last stroke radicals are key name radicals, there is no need to use strokes to distinguish characters through strokes, instead, the key "O" is stricken. The key "O" may also be used to avoid the repetition code of characters. The examples for encoding of 2-radical composite character are as follows: (see the appendix Table V: B)

(3) 3-radical composite characters:

The four codes for 3-radical composite characters are successively derived from the starting stroke radical, the last stroke of the starting stroke radical, the continuing stroke radical, and the last stroke radical. When the starting stroke radical is key name radical, "O" is followed instead by the code of the last stroke.

For example: (see the appendix Table V: C)

If the repetition codes do occur, "O" may be inserted to remove repetition. The function of key "O" to remove repetition code is very important, because the full use of 26 alphabet letters will increase dispersity by $26^4-25^4 = 66,351$ as compared with the use of 25 alphabet letters only. Thus, the repetition is greatly reduced.

(4) Composite characters composed of four radicals and more.

Generally, the codes of the starting stroke radical, the last stroke of the starting stroke radical, the next-to-the-last radical, and the last stroke radical are taken. If the starting stroke radical is a key name radical of one stroke radical, the second code, i.e., the last stroke of the starting stroke radical is substituted by the code of the continuing stroke radical.

The present invention fully utilizes 26 alphabetic letters, the overall dispersity reaches 26×26×26×26=456,976. It is enough to distinguish 60 thousand characters: for example: (see the appendix Table V: D)

(5) Rapid encoding for Chinese terms

With the holo-information encoding method of the present invention, the dispersity reaches 456,976. With this dispersity, in addition to more than 50,000 Chinese characters, one can also input 400,000 terms, with four phonetic letters, i.e., four key strikings. This means that the speed of inputting characters is greatly increased. The Chinese terms may be separately constituted by 2,3,4,5— single characters. 400,000 terms which contain averagely 1.2 million characters would need 1,200,000×4=4.8 million key striking. Now by means of the present method, the key striking needed is only 1.6 million. Only 1.33 times of key striking are needed for each character on the average. One feature of Chinese characters is that sometimes a single Chinese character corresponds to a term or a phrase in Western language. This makes Chinese characters be in an advantageous position as compared with foreign languages as far as inputting information is concerned.

1) Encoding term composed of two Chinese characters

The starting stroke radical and the last stroke radical are taken respectively for two characters of the term (if the radical is the radical character, the last stroke is taken instead), resulting in code of equal length with four phonetic letters.

If any character of a term is a key name radical, the code of the key name radical is followed by "O". For example: (see the appendix Table V: E)

2) Encoding term composed of three characters

The starting stroke and last stroke radicals are taken for the first character and the starting stroke radicals are taken for the second and the third characters.

If the first character happens to be a radical character, its starting stroke radical and last stroke are taken. If the first character is a key name radical, the code of the radical is taken and is followed by "O".

For example: (see the appendix Table V: F)

3) Encoding term composed of four characters and more

For a term with four characters and more, the starting stroke radicals of the first, second, third and the final character are taken. For example, (see the appendix Table V: G)

When nouns for a special purpose are encoded, they can also be divided into subterms: for example: "[28]" can be divided into "KSRS ROGG NBHK MWDH". and when decoded into Chinese character, it is the same as "[28]" (KRRM)

Embodiment 2
Holo-information code II

1. Table of 100 radicals (II). (see appendix Table II)

Holo-information code II is another form (Table (I) of 100 Radicals). In the holo-information code II, 2-digit number code is substituted for one phonetic letter, and other encoding procedures are similar to holo-information code I. The only difference lies in that each radical has a unique code. The use of the starting and last strokes for distinction is unnecessary. Table of 100 radicals (II), which is arranged according to the order of the stroke and the stroke numbers, features easy recognition and easy memory. Both Code I and Code II comply with the knowledge and habits of radicals, the order of strokes, and strokes, the only difference lies in that the Code II does not derive information from phonetic transcription. It is designed for the users who do not know Western languages and phonetic alphabet. It is particularly useful for the blind, and it can be operated with a small keyboard using only 10 digital keys and can be used in a telegram code using numerals as well. Its other feature is higher dispersity: 100×100×100=1,000,000, which is 2.2 times of that of Holo-Information Code I. With this high dispersity, more characters and terms can be accommodated while the code repetition rate is lower.

2. Examples of encoding.

The encoding rule of Holo-Information Code II is substantially the same as Holo-Information Code I. The difference lies in that for Holo-Information Code II, two-digit number codes are used for one radical without need to resorting to strokes, and the blank spaces are filled with *. The asterisk can also be used to avoid repetition codes. For the variant forms and the complex forms of standard radicals in the brackets, the starting strokes and continuing strokes are added.

(1) Single radical character

In the six-digit number code of a single radical character, the first and second digits are the serial number of the radical, followed by asterisk marks (*). While for the variant and complex forms in brackets, they are followed by starting and continuing strokes. (See the appendix table VI: A)

(2) Composite character composed of 2 radicals

In the six-digit number code, the first to the fourth digits are their serial numbers, which are followed by striking the space keys (filled by asterisk marks). (See the appendix table VI: B)

(3) Composite character composed of 3 radicals and more

In the six digits, the first to the sixth digits are their serial number, for example. (See the appendix table VI: C)

(4) Rapid encoding for terms and documents 1) terms composed of two characters

The starting stroke and last stroke radicals of the first character and the last stroke radical of the second character are taken (if the first character is a radical character, the starting stroke radical of the second character is taken instead). (See the appendix table VI: D)

2) Rapid encoding for a term composed of three characters or more

The starting stroke radical of the first character, the last stroke radical of the second character, and the last stroke radical of the last character are taken. (See the appendix table VI: E)

3. Radical adjustment, repetition code removal and functional key (1) Radical adjustment The radicals in the two Tables can be adjusted. It is for unifying the Holo-Information Code I and Holo-Information Code II that the unified 100 radicals are used. But radicals are subjected to adjustment. Code I and Code II may be different. The radicals of Code I may be increased or decreased, even the 214 radicals of Kang Xi Dictionary or the 56 new radicals of Wang Zhu Xi, or other radical system may be used. But the 100 radicals are preferred. The number of radicals on Code II may be reduced to less than 100 while the 2-digit number is maintained. Alternatively, radical characters and several hundreds of characters generally used as side components may be numbered with 3-digit numbers and 2 radicals (or 2 side components or one radical and one side component) can be taken to form 6-digit number code. Or, three radicals (or the combination of radicals with components) are taken to form a 9-digit number code, as long as the looking-up of the codes is convenient and the dispersity is large enough. For example, "[4]" is numbered with 071, "[29]" is numbered with 271, then "[30]" is encoded into 071271 (six-digit number code) or 071***271 (9-digit number code) and so on.

(2) The removal of repetition code: No matter how low the code repetition rate is, sometimes repetition codes can still occur. With Code I, the repetition codes may be removed by striking key O and moving its position or by striking digit keys 1,2,3,4,5,6,7,8,9, or 0. With the Code II, * key (asterisk mark) may be stricken for the removal of repetition codes. When removing the repetition codes, the priority is given to the higher frequency characters. i.e., characters with lower frequency give ground to higher frequency characters.

(3) Function keys: The function key can be used in prompting, error correction, distinguishing the various forms of Chinese characters (simple, complex, standard variant, erroneous forms) and in mingled composition of Chinese and foreign languages, etc.

As is summarized above, the advantages of the present invention lies also in that it is easily popularized and that it has many potential applications. At least the following applications can be developed.

1) Computerized typing, editing, composing (typesetting),

2) Unify telegram code and the telex code into Latinized plain code which can be automatically translated into Chinese by machines, making simpler and easier to handle as compared with the Western languages. Labor and cost can be effectively cut down.

3) Nationwide postal code can be unifiedly encoded by people themselves without the need of resorting to the special post code books which are time consuming and inconvenient. Several hundreds of provinces, and cities, and several thousands of counties throughout the country can be encoded with no repetition code. While administrative organizations of provinces, municipalities, autonomous regions, counties villages and towns may be encoded separately (see the appendix Table VII)

4) An aid to automatic translation between Chinese and foreign languages by machines. The major difficulty in learning foreign languages by Chinese or learning Chinese by foreigners does not lie in handling grammar but in remembering the large quantity of new words. The Holo-Information encoding method for Chinese characters turns Chinese characters and Chinese terms into 4 Latinized letters which are more easy stored in computer than any foreign languages. With the Holo-information encoding method, Chinese and foreigners can conduct dialogue and interchanges with the aid of machines through a short period of time without learning grammar, rule of phonetic transcription, and the method of encoding. It is difficult for one to master several languages, however, with the present invention, one can conduct dialogue and exchange with foreigners in several languages through the aid of machines. Professional interpreters can also save a lot of time looking up dictionaries.

5) An aid to translation between ancient Chinese and vernacular Chinese, the reason is the same as 4).

6) Stenography

Stenography through the holo-information encoding has the advantage of unification, standardization, and simplicity. The rearrangement and the translation of stenography can be also aided by machines, thus saving time.

7) Shortened writing

With the holo-information code, a Chinese character can be encoded into 1.33 Latin letters on the average, a lot of space and time can be saved.

8) Book cataloguing and dictionary indexing using the present invention has the advantage of being standard, concise, and of less code repetition rate and the number of characters difficult to be retrieved can be reduced.

9) Rapid transcription and recording

The reason is the same as above.

10) Medical self consulting and management consulting for various kinds of trades and organizations including agriculture, forestry, animal husbandry, side line occupation, fishery, industry, commerce, culture, army and administrative departments of government. For example, if input (1) common cold, (2) age, (3) sex, (4) beat of pulse, (5) body temperature, (6) sputum (thick or thin), (7) having cough or no cough and so on, the prescription of a Chinese medicine can be immediately outputted. The holo-information code of the present invention can be also used in various Chinese cards for consulting.

The above-mentioned 10 potential applications all relate to the present method which turn Chinese characters into holo-information codes and which makes Chinese characters more easily manipulated than any foreign language.

The present invention explores the inherent merit of Chinese characters, turns Chinese characters into scientific, standard, concise, excellent and simple codes, thereby erecting a bridge of communication between Chinese and Western civilizations.

FIG. 1 illustrates a keyboard which can be utilized with the preferred embodiment of the present invention. The keyboard 1 has a plurality of keypads 2 which correspond to a typical Western keyboard having Latin characters. The keypads 2 also have Chinese characters associated therewith. This enables the operator to both input Latin characters or Chinese characters.

FIG. 2 illustrates an electronic system which utilizes the concepts of the present invention. This system includes a keyboard 1 similar to the one illustrated in FIG. 1 for inputting Chinese characters. The inputted Chinese characters are outputted to a keyboard interrupt handling unit 3 which acts as an interface between the keyboard 1 and a management module 4. The keyboard interrupt handling unit 3 inputs the information received from the keyboard 1 into a Chinese character input unit 6 which determines if the inputed information is in a Chinese character. If this information is representative of a Chinese character, the information is transferred to a code conversion unit 5. The code conversion unit 5, using a comparison table 7, converts the Chinese character into either a Latin character code or a numeric code which can be utilized by an electronic device. After conversion, the converted code is transferred back to the Chinese character input unit 6 and outputted to the electronic system. If the information from the keyboard represents only Latin characters, the conversion process is by-passed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Table I

100 部首表 (I)

A [广(广ㄏ广广扩)]

B [卜(卜)] 八(ᐯ) 勹(ㄅㄉ) 匕
　氵(〈〈〉) 贝(貝见見) 彡

C [虫(䖝)] 寸 车(亚皿)

D [石] 、丁(丅丁) 刀(刂) 歹 豆

E [耳(阝卩)] 二(丨刂ㄣㄑ) 儿(兒兀)

F [丰(豐丰丰)] 风(風凡几凢) 方

G [廾(卄屮)] 乁 干(ㄔ) 工(ㄩㄈ) 弓
　什 鬼

H [火(灬)] 亠

I [幺(纟糸)] 乂(十七) 衣(ㄷ衣衤)

J [金(钅)] 冂(月冖) 巾 彐(ㄣㄥ)
　已(巳) 子(孑) 臼

K [口(冂凵)]

L [立] 力 舟(角) 里(虫里虫)

M [木] 门(門) 马(馬) 毛 日(日)

N [女(戈)] 丶 廿(䒑) 牛(牜止) 鸟(鳥)

O (去重码功能键)

P [爿(斗片)] 丿(丿)

Q [犬(犭为多彡)] 礻(礻示) 欠

R [人(亻)] 日(日)

S [氵(几彡巛水氺)] ム(厶厶) 士(土)
　夊 身 食(饣食)

T [扌(手手手)] 丿 田(中)

U [亚(业平业平业米亜)] 兀(六尤)

V(Ü) [鱼(魚)] 雨 于(辛于于于)

W [王(玉)] 乛 韦(韦) 文(攵攴)

X [心(忄小)] 夕 小(ㄚ") 习(羽)
　穴(宀) 西 帝

Y [月(冂目夕)] 又 页(頁) 羊(羊羊)
　音(讠)

Z [竹(𥫗)] 丨 止(丄) 爪(爫爪) 走(辶辶)

* [ ]内为键名部首, ( )内为变体、繁体; 左折、右折均作弓, 凡带钩的一律作勾, 存
　勾亦作勾.
** "广"有两读, 在此处念 ān, 同"庵", "石"亦有两读, 在此处念 dàn, 为容量单位.

Table II

100 部首表 (II)

| | | | |
|---|---|---|---|
| 01 一 | 26 士(土) | 51 廿(艹) | 76 立 |
| 02 丨 | 27 工(工コ) | 52 木 | 77 穴(宀) |
| 03 丿(/) | 28 井(卄中) | 53 犬(犭牜) | 78 耳(阝卩) |
| 04 丶 | 29 尢(六尢) | 54 歹 | 79 酉 |
| 05 乀 | 30 寸 | 55 车(车车) | 80 页(頁) |
| 06 丿 | 31 扌(手手扌) | 56 止(止) | 81 虫(虵) |
| 07 乛 | 32 口(門口) | 57 日(日丿) | 82 竹(竺) |
| 08 乁 | 33 山 | 58 贝(貝见兒) | 83 白 |
| 09 二(川丿彡《) | 34 巾 | 59 牛(牜牲) | 84 用(角) |
| | 35 夕 | 60 毛(毛) | 85 衣(镸衤礻) |
| 10 丁(丁又) | 36 广(广宀厂广) | 61 爪(爫爪) | 86 羊(羊羊) |
| 11 卜(卜) | | 62 父 | 87 走(走辶) |
| 12 冂(冖一) | 37 门(門) | 63 月(月月夕) | 88 巫(业业半求永 |
| 13 又(十七) | 38 子(儿彡巛水半) | 64 风(風儿几凡) | 巫业) |
| 14 八(丷) | 39 彐(彐互) | 65 欠 | 89 艮 |
| 15 人(亻) | 40 弓 | 66 文(攵攴) | 90 黑(黑黑黑) |
| 16 勹(力力) | 41 巳(已) | 67 方 | 91 身 |
| 17 儿(兒九) | 42 女(戈) | 68 火(灬) | 92 百(丨) |
| 18 匕 | 43 马(馬) | 69 心(忄小) | 93 辛 |
| 19 氵(巛〈冫) | 44 幺(纟糸) | 70 斗(斗斗) | 94 雨 |
| 20 又 | 45 小(⺌ⱽ) | 71 示(礻示) | 95 金(釒) |
| 21 刀(刂) | 46 习(羽) | 72 石 | 96 鱼(魚) |
| 22 力 | 47 子(子) | 73 目(目) | 97 革 |
| 23 厶(厶厷) | 48 丰(夬丰丰) | 74 田(甲) | 98 鬼 |
| 24 平(乎) | 49 王(玉) | 75 鸟(鳥) | 99 食(飠食) |
| 25 干(干于于于) | 50 韦(韋) | | 00 髟 |

Table III

| Code No. | Chinese Character | Code No. | Chinese Character |
|---|---|---|---|
| [1] | 火 | [16] | 井 |
| [2] | 灬 | [17] | 页 |
| [3] | 仓 | [18] | 见 |
| [4] | 彡 | [19] | 白 |
| [5] | 豸 | [20] | 贝 |
| [6] | 豖 | [21] | 杞 |
| [7] | 门 | [22] | 乙 |
| [8] | 匚 | [23] | 永 |
| [9] | 凵 | [24] | 鞘 |
| [10] | 彐 | [25] | 廿口十小月 |
| [11] | 勹 | [26] | 一丨丨—……丿乛— |
| [12] | 冂 | [27] | 發 |
| [13] | 目 | [28] | 中华 人民 共和 国 |
| [14] | 且 | [29] | 刘 |
| [15] | 平 | [30] | 浏 |

Table IV

The oules for the order of stroke (1) first horizontal stroke, then vertical stroke "十" is decomposed into "一｜"

"干" is decomposed into "――｜"

(2) first left-falling stroke, then right-falling stroke

"人" is decomposed into "丿乀"

"大" is decomposed into "一丿乀"

(3) first upper part, then lowe part

"兀" is decomposed into "一丿乚"

"匹" is decomposed into "一丿乚L"

(4) first left, then right

"汁" is decomposed into "丶丶丿一｜"

"仁" is decomposed into "丿｜――"

(5) first outer part, then inner part

"月" is decomposed into "丿㇆――"

"勺" is decomposed into "丿㇆丶"

(6) first outer part, then inner part and then cloding stroke

"日" is decomposed into "｜㇆――"

"四" is decomposed into "｜㇆丿L―"

(7) first middle, then two sides

"小" is decomposed into "｜丿丶"

"山" is decomposed into "｜L｜"

Table V

A.  一 : HHOO    二 : EHHO    三 : SHHH

宀 : MDGO    门 : MDSG    金 : JPNH

马 : MWGH    木 : MHSN    目 : MSWH

B.  冰 : BTSO    江 : SOGH    扛 : TOGO

闰 : MGWO    柱 : MOWO    枚 : MOWN

C.  种 : IIDKS    桂 : MOTT    花 : CORB

祝 : QDKE    贺 : LPKB    你 : ROBX

合 : ROHK    欢 : YDBR    树 : MOYC

D.  民 : GGHG    族 : THRQ    麒 : AWEB

麟 : AGWS    醇 : XHLH

E.  海洋 : SDSY    国家 : MHDB    乙炔 : GGHR

人民 : ROGG    幸福 : TSQT    辛勤 : LSNL

F.  地球仪 : TGWR    金字塔 : JODT    大世界 : QNNT

不夜城 : DBTT : 游乐场 : SHPT.

G.  统一战线 : YHBY; 胸有成竹 : YSAZ; 成竹在胸 : AZSY;

中华人民共和国 : KRRM; 诺贝尔奖金 : YBBJ; 鲁迅全集 : VGRZ;

二十四史 : ESMK; 高能物理 : TSNW; 万里长征 : DLPE

万里长城 : DLPT; 达尔文学说 : QBWY; 马克思列宁主义 : MSTD;

马列主义 : MDTK;

Table VI

A 一：0 1 * * * * 二：0 9 * * * * 三：3 0 * * * *

冂：2 3 * * * * 门：4 2 * * * *

马：4 9 * * * * 木：5 6 * * * * 目：7 4 * * * *

B 冰：2 2 7 1 * * 江：7 1 3 3 * * 扛：3 6 3 3 * *

闰：4 2 5 3 * * 杠：5 6 3 3 * * 枚：5 6 6 7 * *

C 种：7 6 3 7 0 2 桂：5 6 3 2 3 2 花：3 4 1 6 2 0

祝：7 2 3 7 1 8 贺：2 9 3 7 6 2 你：1 6 1 7 5 0

合：1 6 0 1 3 7 欢：2 6 1 7 1 6 树：5 6 2 6 3 5

民：3 3 0 1 0 8 旗：2 1 1 6 5 7 枫：4 1 0 9 1 5

蒯：4 1 0 7 0 2 醇：8 1 2 7 0 1

D 海洋：7 1 0 4 8 7 国家：2 3 0 1 2 2 乙炔：0 8 6 8 1 6

人民：1 6 3 3 0 8 幸福：3 2 1 0 7 5 辛勤：7 8 1 0 2 9

E 地球仪：3 7 0 4 1 4 金字塔：9 6 0 1 3 7 聪明特致：4 9 1 0 1 4

大世界：5 7 1 7 0 9 不夜城：1 2 0 5 0 4

游乐场：7 1 5 0 0 9

统一战线：4 8 0 1 0 4  胸有成竹：6 5 6 5 8 3

成竹在胸：1 1 8 3 2 4  中华人民共和国：3 7 1 0 0 1

诺贝尔奖金：9 3 6 2 9 6  马列主义：4 9 5 8 1 4

Table VII

| | | | | | |
|---|---|---|---|---|---|
| 北京 | SBTX | 上海 | BHSD | 天津 | ERSG |
| 广州 | AODS | 广东 | AOHX | 广西 | AOXH |
| 云南 | ESSS | 浙江 | SDSG | 江西 | SGXH |
| 江苏 | SGCB | 福建 | QTJZ | 湖北 | SYSB |
| 湖南 | SYSS | 青海 | FYSD | 河南 | SKSS |
| 海南 | SDSS | 新疆 | LOGH | 西藏 | XHCD |
| 贵州 | KBDS | 宁夏 | DDDX | 台湾 | SKSG |
| 四川 | MHPS | 辽宁 | LZDD | 吉林 | SKMM |
| 河北 | SGSB | 山东 | SSHX | 山西 | SSXH |
| 安徽 | DNEW | 黑龙江 | LHSS | 内蒙古 | MRCS |

What is claimed is:

1. A method for encoding a character, the character including one or more radicals, each having a predetermined radical name and one or more strokes written in a predetermined order to create each radical and said step (b) further includes, each of the strokes having a predetermined stroke name, comprising the steps of:

(a) phonetically translating at least one of said radical names of said one or more radicals included in said character into a first group of series of one or more symbols;

(b) phonetically translating at least one of said stroke names of at least one of said one or more radicals into a second group of one or more series of symbols;

(c) inputting a code of the character into a decoder utilizing the first symbol of one of the series of said first group of series followed by the first symbol of each of the series of one or more symbols of said second group of series in the same order in which the corresponding strokes are written; and (d) displaying said character in response to said decoder;

wherein the radicals are writtenn in a predetermined order to create said character and said step (c) includes inputting a code of the character utilizing the first symbol of each of the said series of one or more symbols in the same order in which the corresponding radicals are written.

2. A method for encoding a character including a single radical, said radical having a predetermined radical name and including one or more strokes written in a predetermined order to create each radical the strokes having predetermined stroke names, the method comprising:

(a) translating said radical name into a corresponding alphabetical representation of the phonetic pronunciation of said radical name;

(b) translating one, two or three of the stroke names into corresponding alphabetical representations of the phonetic pronunciation of the stroke names of the strokes of the radical;

(c) inputting a code of the character into a computer, the code including the first letter of the corresponding alphabetical representations of the translated radical name followed by the first letter of the alphabetical translation of said stroke names, the first letters entered in the same order as the strokes are written; and (d) creating a Chinese character signal in response to the code input into the decoder in step (b).

3. A method for encoding a character including first and second radicals, the radicals being written in a predetermined order to create said character and having predetermined radical name, each radical including one or more strokes, the strokes being written in a predetermined order to create each radical, the strokes having predetermined stroke names, the method comprising:

(a) translating into alphabetical representations of the phonetic pronunciation, the radical names of said first and second radicals, and the stroke names of the last strokes of the first and second radicals;

(b) inputting a code of the character into the computer, the code having the first letter of the translated first radical name, followed by the first letter of the stroke name of the translated last stroke of the first radical, followed by the first letter of the translated radical name of the second radical, followed by the first letter of the translated stroke name of the last stroke of the second radical; and (c) creating a Chinese character signal in response to the code input into the computer in said step (b).

4. A method for encoding a character including first, second and third radicals, the radicals written in a predetermined order to create said character and having predetermined radical names, each radical including one or more strokes, the strokes being written in a predetermined order to create each radical, the strokes having predetermined stroke names, the method comprising:

(a) translating into alphabetical representations of the phonetic pronunciation, the radical name of said first, second and third radicals and the stroke name of the last stroke of the first radical; and (b) inputting a code of the character into a computer, the code having the first letter of the translated radical name of the first radical, followed by the first letter translated stroke name of the last stroke of the first radical, followed by the first letter of the translated radical name of the second radical, followed by the first letter of the translated radical name of the third radical; and (c) creating a Chinese character signal in response to the code input into the decoder in step (b).

5. The method of claim 1 wherein step (d) includes addressing a memory based on the inputted code;

outputting from said memory a display representation of said character;

displaying based on said display representation.

6. The method of claim 2 wherein step (d) includes addressing a memory based on the inputted code;

outputting from said memory a display representation of said character;

displaying based on said display representation.

7. The method of claim 3 wherein:

step (d) includes addressing a memory based on the inputted code;

outputting from said memory a display representation of said character;

displaying based on said display representation.

8. The method of claim 4 wherein:

step (d) includes addressing a memory based on the inputted code;

outputting from said memory a display representation of said character;

displaying based on said display representation.

9. An apparatus for display of a Chinese character including one or more radicals, the radicals written in a predetermined order to create said character and having predetermined radical names, each radical including one or more strokes, the strokes being written in a predetermined order to create each radical and having predetermined stroke names, the apparatus comprising:

inputting means for inputting a code of the character into a first memory, the code including the first letters of corresponding alphabetical representations of phonetic translations of the radical names in the same order in which the radicals are written, and the first letters of corresponding alphabetical representations of phonetic translations of the stroke names in the same order in which the strokes are written;

translation means, including a second memory, for translating the inputted code of the character into digital display information; and display means for displaying the Chinese character based upon the digital display information.

* * * * *